2,867,650

PROCESS FOR THE PREPARATION OF MONO-DIOL ESTERS OF TEREPHTHALIC ACID

Otto Ernst van Lohuizen, Delft, and Eric Jan Mouton, The Hague, Netherlands, and Ferdinand Leonard Schouteden, Wilrijk-Antwerp, Belgium, assignors to Gevaert Photo-Producten N. V., Antwerp, Belgium, a Belgian company No Drawing. Application October 13, 1955
Serial No. 540,336

Claims priority, application France October 14, 1954

2 Claims. (Cl. 260—475)

The invention relates to a process for preparing monodiol esters of terephthalic acid.

It is known to prepare esters of terephthalic acid, for instance mono-alkyl esters, by partial hydrolysis of the dialkyl esters. Hydrolysis by saponification in homogeneous medium with sodium- or potassium hydroxide is preferred; after acidification a mixture of unconverted di-ester, mono-ester and free terephthalic acid is obtained.

Mono-esters of terephthalic acid may also be obtained directly by esterification with an aliphatic primary alcohol; but only at temperatures above 250° C. a fairly satisfactory yield of mono-alkylesters was obtained.

It is also known to prepare these esters by oxidation of esters from p-alkyl benzoic acid.

It is an object of the present invention to prepare acid mono-diol esters of terephthalic acid.

It is a further object of the present invention to prepare a new raw material for the preparation of aromatic poly-esters.

Other objects will appear from the following description.

We have found that mono-diol esters of terephthalic acid may be obtained in a simple way and with a very favorable yield by ester-interchange reaction of salts of mono-alkyl esters of terephthalic acid with diols, followed by liberating the corresponding acid according to the formula

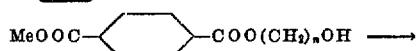

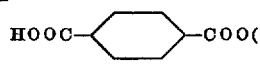

wherein $n = 2$ to $6$

Me = metal atom

As raw material all metal salts may in principle be used. In practice, the salts soluble in the used diol are preferred. Sodium and potassium among others meet these requirements.

The speed of the ester interchange reaction is favorably influenced by the presence of ions produced by the dissociation of metal diol compounds. In the absence of these ions, this ester interchange proceeds so slowly that high temperatures or long reaction times are required, so that in practice, these ions are essential. Moreover the metal diol compounds, easily soluble in the corresponding diol, are likewise to be preferred. The metal atom may be the same or not as the metal atom present in the starting product.

The reaction proceeds quickly at room temperature and gives a high yield (more than 90%) when using esters of primary alcohols with 1–6 carbon atoms. As the reaction is reversible it is desirable to work with an excess of diol or to eliminate by distillation the alkyl alcohol formed during the reaction, in order to prevent the reaction of both hydroxyl groups of the diol under formation of a compound of the type

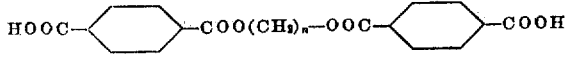

After isolation and recrystallization of the formed salt, the reaction liquid as such may be used for a next ester interchange reaction. The monodiol terephthalate may be liberated from the obtained salt with an acid. One method is by using ion exchangers.

The ester interchange reaction may also be carried out with alkyl esters containing more than 6 carbon atoms or with the monophenol ester of terephthalic acid, or with esters of secondary alcohols. Esters of tertiary alcohols are less favorably converted.

One could expect that monodiol esters of terephthalic acid might easily be obtained by direct esterification according to the following reaction scheme.

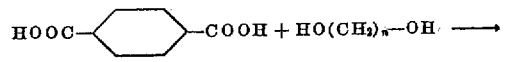

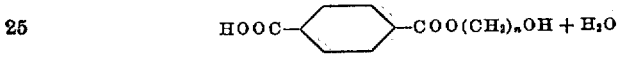

In this reaction, however, as well as in the partial hydrolysis, a mixture of the diol, mono-diol terephthalate, didiol terephthalate, terephthalic acid and the ester of 3 molecules diol with 2 molecules terephthalic acid are produced. Owing to the poor solubility of the dicarboxylic acid in diols under 250° C., it is necessary to esterify under pressure and above this temperature. The yield of monodiol ester is rather low.

The following examples illustrate our invention without limiting, however, the scope thereof.

Example 1

To 24.2 gm. sodium, dissolved in 900 gm. dry ethylene glycol, 180 gm. pure mono-methyl terephthalate are added. After half an hour stirring at about 45° C., a practically transparent solution is obtained, which after filtration is decanted into a mixture of 2 l. water and 145 ccs. strong hydrogen chloride. The precipitated monoglycol terephthalate is isolated in a centrifuge and washed with water. After one recrystallization from a mixture of methanol and water (1:2), the melting point is about 180° C. Yield: 198 gm. (94%). After recrystallization from amyl acetate or water, the melting point is 184.5–185.5° C.

Example 2

To 1 gm. of sodium, dissolved in 90 gm. dry ethylene glycol, 8.5 gm. pure mono-butyl terephthalate are added. After half an hour stirring at 40° C., a practically transparent solution is obtained, which after filtration is decanted into a mixture of 150 ccs. water and 4 ccs. strong hydrogen chloride. The precipitated mono-glycol terephthalate is isolated in a centrifuge and washed with water. After one recrystallization from a mixture of methanol and water (1:2), the melting point is about 180° C. Yield: 7.5 gm. (93%).

It is to be noted that in principle, the use of great quantities of metallic sodium may be avoided by converting previously the mono-alkyl ester into its salt, for instance by adding to an aqueous solution of the monoalkyl terephthalate an equivalent quantity of sodium hydroxide and to isolate the salt formed.

The reaction temperature may vary widely; from 20° C. the reaction proceeds smoothly. By heating to 80° C., the reaction speed is considerably increased without any complication or disturbing side-reaction. Monoglycol terephthalate cannot be purified by distillation, since above melting point polycondensation sets in directly. The product can be purified by recrystallization from amyl acetate or ethyl acetate and water.

*Example 3*

100 gm. mono-methyl terephthalate and an equivalent quantity of sodium bicarbonate are heated in 500 ccs. water to 90° C. Carbon dioxide is developed and a practically transparent solution is obtained wherefrom after warm filtration and cooling, the sodium mono-methyl terephthalate crystallizes. Yields 74%.

To a solution of sodium glycolate in glycol, prepared from 6 kg. dry glycol and 11.4 gm. sodium, 1 kg. dry sodium mono-methylterephthalate is added. After about 45 minutes' stirring at 60–65° C., a practically homogeneous solution is obtained. After filtration and cooling, the sodium mono-glycol terephthalate crystallizes. Yield: about 50%. After filtration of the crystal mass, the sodium mono-glycol terephthalate, if necessary, may be purified by recrystallization from water. The resulting filtrate may be used for another ester interchange reaction.

50 gm. sodium mono-glycol terephthalate are dissolved in 100 ccs. water. Whilst stirring, an equivalent quantity of 4 N hydrogen chloride is added, the precipitated mono-glycolterephthalate is sucked off and dried and, if necessary, recrystallized from water. Melting point: 184.5–185.5° C. Yield: 90%.

*Example 4*

To a solution of potassium glycolate in glycol, prepared from 41 gm. potassium and 900 gm. dry glycol, 180 gm. dry mono-methyl terephthalate are added. After 45 minutes stirring at 45° C., the solution is decanted in a mixture of 2 l. water and 130 ccs. strong hydrogenchloride. The precipitated mono-glycol terephthalate is isolated in a centrifuge and washed with water. By recrystallization from water or amyl acetate the product is obtained in pure form.

We claim:

1. Process for the preparation of monoglycol esters of terephthalic acid, comprising reacting at a temperature between 20° C. and 110° C. a monoester of terephthalic acid selected from the group of alkyl and aryl esters, the ester radical containing 1 to 6 carbon atoms, with a mixture containing an excess of glycol and alkali metal ions in an amount sufficient to form an alkali salt of the monoester and alkali glycolate, the glycol radical being of the series —$(CH_2)_nOH$ wherein $n$ is an integer from 2 to 10, the excess of glycol being such as to substantially prevent the reaction of both of its hydroxyl groups, both the alkali salt and glycolate used being soluble in the glycol, allowing the alkali glycolate to dissociate, using the alkali ion as an ester interchange catalyst, and recovering the monoglycol terephthalate by an acid treatment.

2. In the process according to claim 1, using monomethyl terephthalate as said monoester of terephthalic acid, using ethylene glycol as said glycol, and using an alkali metal selected from the group consisting of sodium and potassium.

References Cited in the file of this patent
UNITED STATES PATENTS

| | | |
|---|---|---|
| 2,465,319 | Whinfield | Mar. 22, 1949 |
| 2,742,494 | Mraz | Apr. 17, 1956 |